(12) United States Patent
Tsai (10) Patent No.: US 12,522,126 B1
(45) Date of Patent: Jan. 13, 2026

(54) CAR FRONT PROTECTION BAR ACCOMODATING LIGHT BEAD ASSEMBLIES

(71) Applicant: Stay Tuned Performance, Walnut, CA (US)

(72) Inventor: Yaw Hong Tsai, Hacienda Heights, CA (US)

( * ) Notice: Subject to any disclaimer, the term of this patent is extended or adjusted under 35 U.S.C. 154(b) by 0 days.

(21) Appl. No.: 19/055,136

(22) Filed: Feb. 17, 2025

(51) Int. Cl.
| | |
|---|---|
| B60Q 1/04 | (2006.01) |
| F21S 41/19 | (2018.01) |
| F21S 43/19 | (2018.01) |
| F21V 23/00 | (2015.01) |
| F21W 107/10 | (2018.01) |

(52) U.S. Cl.
CPC ......... B60Q 1/0483 (2013.01); B60Q 1/0441 (2013.01); F21S 41/192 (2018.01); F21S 43/195 (2018.01); F21V 23/002 (2013.01); *F21W 2107/10* (2018.01)

(58) Field of Classification Search
CPC ..... B60Q 1/0483; B60Q 1/0441; F21S 41/19; F21S 41/192; F21S 41/194; F21S 41/196; F21S 41/198; F21S 4/28
USPC ......................................................... 362/549
See application file for complete search history.

(56) References Cited

U.S. PATENT DOCUMENTS

| | | | | |
|---|---|---|---|---|
| 4,488,206 A * | 12/1984 | Mizusawa | ............ | B60Q 1/0441 24/297 |
| 6,939,029 B1 * | 9/2005 | Stahel | ................... | F21V 17/164 362/240 |
| 7,611,269 B1 * | 11/2009 | Lyons | ................. | B60Q 1/2611 362/544 |

* cited by examiner

*Primary Examiner* — Robert J May
(74) *Attorney, Agent, or Firm* — Tommy SF Wang; Wang IP Law Group, P.C.

(57) ABSTRACT

A car front protection bar with an integrated lighting device includes a protection bar body and a plurality of lamp bead assemblies. The protection bar body has multiple positioning holes for mounting the lamp bead assemblies. Each lamp bead assembly includes a light-transmitting panel and a lamp housing base. The lamp housing base has outwardly extending locking members on both sides. The locking members, in conjunction with the light-transmitting panel, form an installation slot configured to engage with the edges of the positioning holes. By designing the protection bar body and the lamp bead assemblies as separate components, the present application achieves modular maintenance. If a lamp bead assembly is damaged, only the faulty module is replaced, avoiding full protection bar replacement and reducing costs. The split-type design allows compatibility with various vehicle models, enabling installation on different protection bars without modification, enhancing adaptability, flexibility, and efficiency.

10 Claims, 6 Drawing Sheets

CAR FRONT PROTECTION BAR ACCOMODATING LIGHT BEAD ASSEMBLIES

FIELD OF THE INVENTION

The present invention generally relates to automotive modification accessories, more particularly, to a car front protection bar with lights.

BACKGROUND OF THE INVENTION

Conventional car front protection bar primarily serves a protective function. When a minor collision occurs with the vehicle in front, it provides a certain cushioning and protective effect. However, after installing the protection bar, it may block the vehicle's position indicator lights from certain angles, affecting the warning effect. To address this, the existing front protection bar is manufactured as a one-piece molded structure with integrated lights. However, in such a conventional design, if a lighting component is partially damaged, the entire front protection bar must be replaced, resulting in higher maintenance costs and increased mold development expenses.

SUMMARY OF THE INVENTION

In order to overcome the disadvantages associated with the aforementioned car front protection bar, a car front protection bar with a lighting device is disclosed. The car front protection bar with a lighting device may include a protection bar body and a plurality of lamp bead assemblies. The protection bar body is provided with multiple positioning holes configured for the installation of the lamp bead assemblies. Each of the lamp bead assemblies includes a light-transmitting panel and a lamp housing base. The lamp housing base has outwardly extending locking members on both sides. The locking members and the light-transmitting panel form an installation slot. The installation slot is configured to engage the edge of the positioning holes.

The car front protection bar with a lighting device may be configured such that locking members that are inclined upward from the bottom of the lamp housing base, wherein an outer surface of the locking members are formed as a curved surface.

The car front protection bar with a lighting device may further include a reinforcement rib at the connection between the locking members and the lamp housing base.

The car front protection bar with a lighting device may be configured such that locking members are elastic, wherein the contact block has a height H, wherein when the contact block is not subjected to an external force, a distance L is defined between the outer end of the locking members and the lamp housing base, wherein L>H, and wherein when the contact block is pressed under an external force, a distance S is defined between the outer end of the locking members and the lamp housing base, wherein S<H.

The car front protection bar with a lighting device may be configured such that a bottom of the lamp housing base includes a positive terminal opening and a negative terminal opening, which are respectively configured to allow positive and negative electrical wiring to penetrate into the interior of the lamp housing base.

The car front protection bar with a lighting device may further include a lamp bead positioned within the lamp housing base.

The car front protection bar with a lighting device may be configured such that the light-transmitting panel and the lamp housing base that are joined by ultrasonic welding.

The car front protection bar with a lighting device may be configured such that a distance D is defined from an outer edge of the light-transmitting panel to the lamp housing base, wherein D≥L.

Compared with the conventional car front protection bar, the present application provides the following advantages:

The car front protection bar with a lighting device of the present application can achieve modular maintenance by separately configuring the protection bar body and the lamp bead assemblies. When a lamp bead assembly is partially damaged, only the damaged lamp bead assembly needs to be replaced without requiring the replacement of the entire front protection bar, thereby significantly reducing maintenance costs. Once the light-transmitting panel and the lamp housing base are assembled, the lamp bead assembly is installed into the positioning hole using an interference fit, wherein the installation slot engages with the edge of the positioning hole to complete the installation. Furthermore, due to the split-type design, the lamp bead assemblies are adaptable to different vehicle models, requiring only installation onto different protection bar bodies to achieve full functionality, thereby enhancing adaptability, improving maintenance flexibility, and increasing economic efficiency.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE PREFERRED EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Referring to FIGS. 1 to 6, a car front protection bar with a lighting device is provided, comprising a protection bar body 1 and a plurality of lamp bead assemblies 2. The protection bar body 1 includes a plurality of positioning holes 3 configured to accommodate the lamp bead assemblies 2. Each lamp bead assembly 2 includes a light-transmitting panel 4 and a lamp housing base 5. The lamp housing base 5 includes locking members 6 extending outward on both sides. An installation slot 7 is formed between the locking members 6 and the light-transmitting panel 4. The installation slot can engage an edge of the positioning holes 3.

The car front protection bar with a lighting device of the present application achieves modular maintenance by separately configuring the protection bar body and the lamp bead assemblies. When a lamp bead assembly is partially damaged, only the damaged lamp bead assembly needs to be replaced without requiring the replacement of the entire front protection bar, thereby significantly reducing maintenance costs. Once the light-transmitting panel and the lamp housing base are assembled, the lamp bead assembly is installed into the positioning hole using an interference fit, wherein the installation slot engages with the edge of the positioning hole to complete the installation. Furthermore, due to the split-type design, the lamp bead assemblies are adaptable to different vehicle models, allowing installation on different protection bar bodies without modification, thereby enhancing adaptability, improving maintenance flexibility, and increasing economic efficiency.

Figure 4:
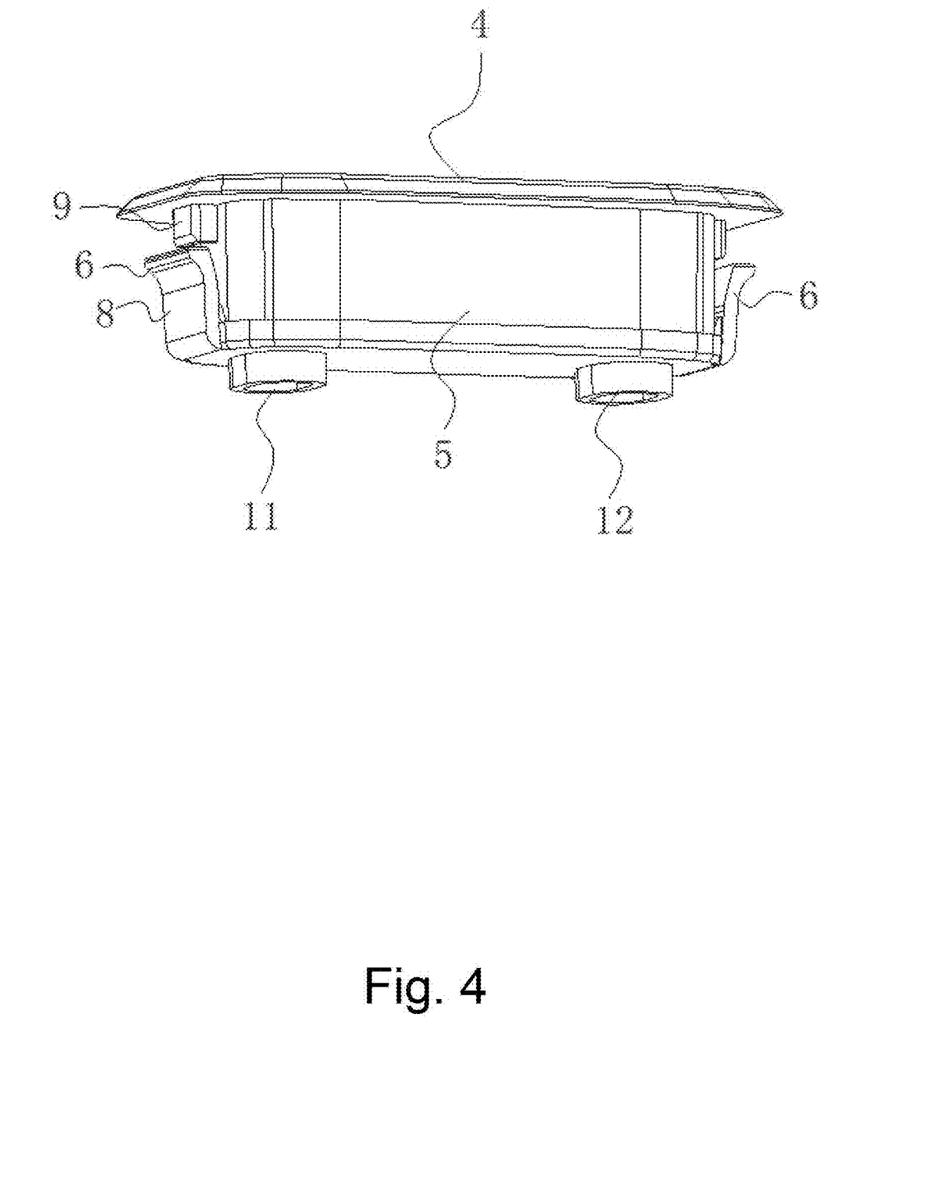
FIG. 4 shows a three-dimensional perspective view of an lamp bead assembly in an embodiment of the present application.
Figure 5:
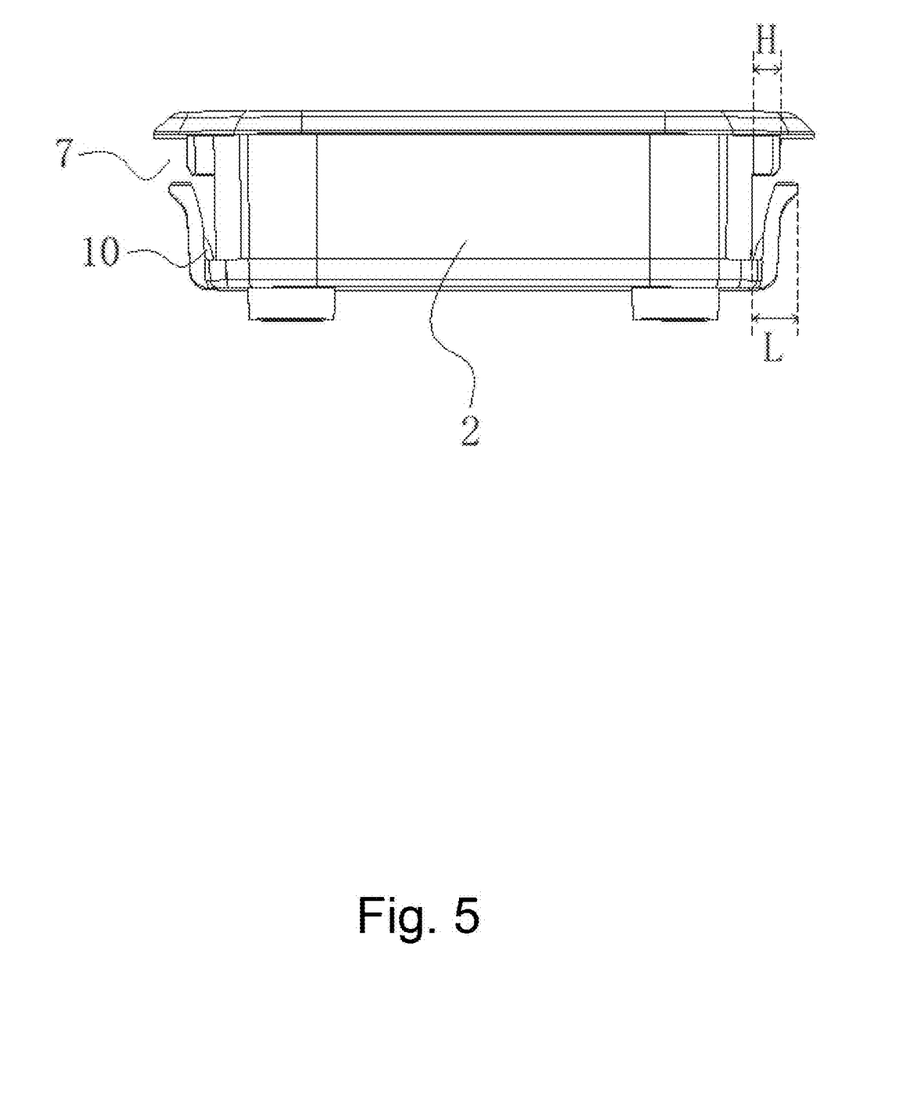
FIG. 5 shows a front view of a locking member in an unstressed state, shown in FIG. 4.
Figure 6:
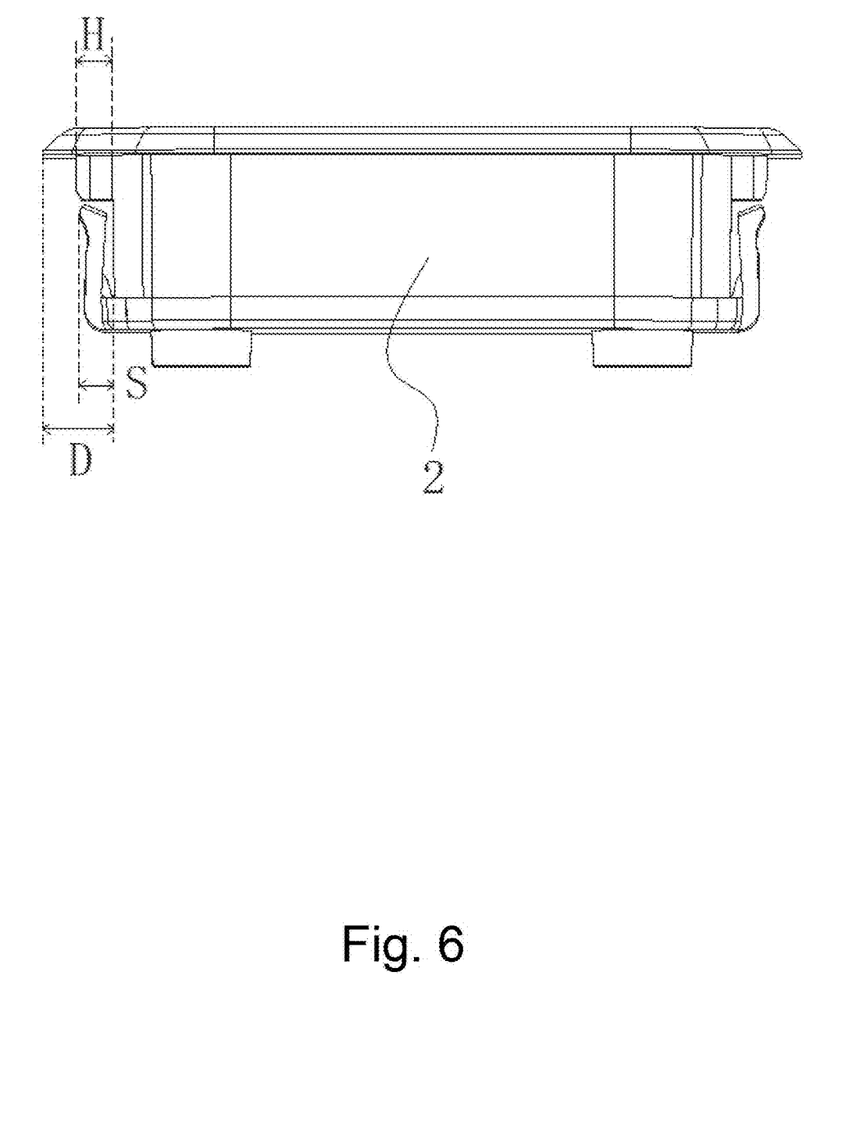
FIG. 6 shows a front view of the locking member under an applied external force, shown in FIG. 4.

In an embodiment, the locking members 6 are provided at an upward inclination from the bottom of the lamp housing base 5, and the outer surface of the locking members 6 has a curved surface 8. In this embodiment, when the lamp bead assembly 2 is inserted into the positioning hole 3 from the front side of the protection bar body 1, the curved surface of the locking members 6 abuts against the edge of the positioning hole 3, gradually compressing inward and deforming until the installation slot 7 corresponds with the positioning hole edge, wherein the locking members 6 expand outward due to their elasticity, returning to their initial position to secure the installation slot 7 against the positioning hole edge, thereby achieving a firm attachment. The inclusion of the curved surface 8 facilitates a smoother and more labor-efficient installation process, eliminating the need for additional fasteners, thereby enhancing installation efficiency.

In another embodiment, a contact block 9 is positioned on the lamp housing base 5 between the light-transmitting panel 4 and the locking members 6. When the lamp bead assembly 2 is inserted into the positioning hole 3, the contact block 9 abuts the edge of the positioning hole 3, generating a preload force that prevents the lamp bead assembly 2 from loosening or detaching, thereby enhancing installation stability and durability.

In another embodiment, a reinforcement rib 10 is provided at the connection between the locking members 6 and the lamp housing base 5. The reinforcement rib 10 strengthens the locking members 6, preventing deformation or breakage under external forces, thereby improving connection reliability between the lamp bead assembly 2 and the protection bar body 1. This prevents the lamp bead assembly 2 from loosening or detaching due to vehicle vibrations or impacts, further enhancing its durability.

In another embodiment, the locking members 6 are elastic, and the contact block 9 has a height H, wherein when the contact block 9 is not subjected to an external force, a distance L between the outer end of the locking members 6 and the lamp housing base 5 satisfies $L>H$, and wherein when the contact block 9 is pressed under an external force, a distance S between the outer end of the locking members 6 and the lamp housing base 5 satisfies $S<H$. This configuration allows for secure engagement, easy installation, and convenient removal of the lamp bead assembly 2.

In this embodiment, the lamp bead assemblies 2 can be easily installed, removed, and secured. When the lamp bead assembly 2 is inserted into the positioning hole 3 of the protection bar body 1, the contact block 9 is subjected to pressure from the edge of the positioning hole 3, causing it to elastically deform, thereby making the outer end of the locking members 6 contract inward and allowing the lamp bead assembly 2 to be smoothly inserted. When the external force is removed, the locking members 6 return to their original state due to their elasticity and cooperate with the light-transmitting panel to form the installation slot, which tightly fits with the edge of the positioning hole, creating a firm locking force to prevent the lamp bead assembly 2 from loosening or detaching. To remove the lamp bead assembly, the locking members 6 need only be manually engaged, causing their outer ends to contract inward, allowing for easy removal of the lamp bead assembly 2.

Figure 3:
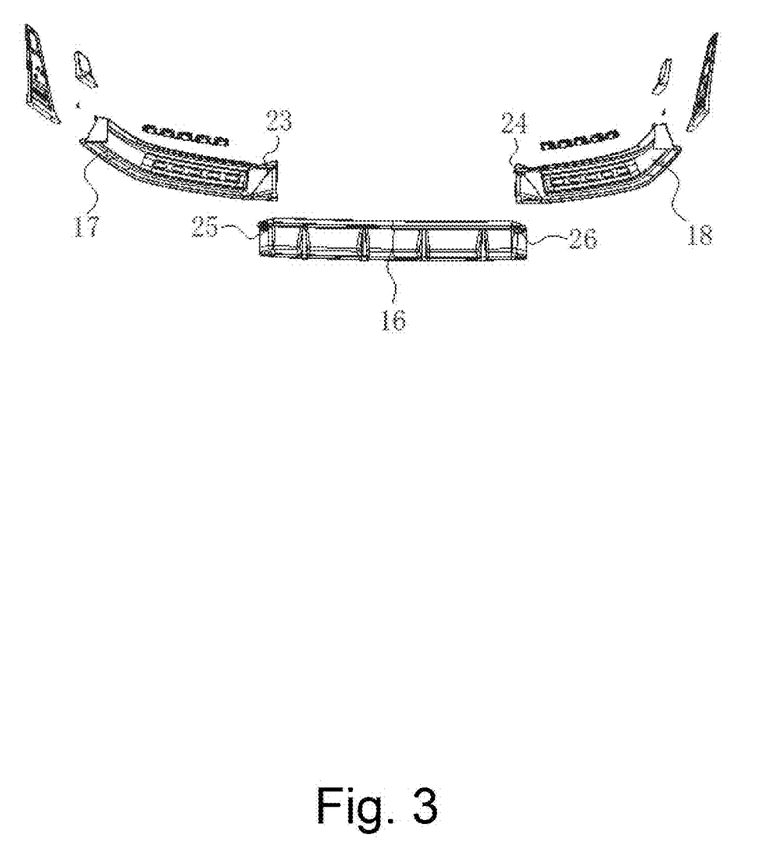
FIG. 3 shows an exploded view of FIG. 2.

In another embodiment, the bottom of the lamp housing base 5 includes a positive terminal opening 11 and a negative terminal opening 12, each configured to allow positive and negative electrical wiring, respectively, to penetrate into an interior of the lamp housing base 5. Multiple lamp bead assemblies may be arranged in series via electrical connections between the positive terminal opening 11 and the negative terminal opening 12, thereby integrating the lamp bead assemblies with the vehicle's lighting system, including daytime running lights, headlights, and turn signals, wherein the lamp bead assemblies function in synchronization In this embodiment, the light-transmitting panel 4 and the lamp housing base 5 are joined by ultrasonic welding, ensuring a strong and sealed connection that enhances the structural strength and water resistance of the lamp bead assemblies 2. Ultrasonic welding utilizes high-frequency vibrations to generate frictional heat, rapidly melting and firmly bonding the contact surfaces between the light-transmitting panel 4 and the lamp housing base 5, forming a tight weld seam that effectively prevents the intrusion of moisture and dust. This connection method not only improves the durability and reliability of the lamp bead assemblies 2 but also enhances their aesthetic appeal and functionality. The light-transmitting panel 4 supports customization, allowing easy modifications to the appearance of the front protection bar by replacing the light-transmitting panel with different designs, colors, or patterns, thereby meeting the individual preferences of vehicle owners.

This design enhances the vehicle's appearance and recognition while providing a low-cost, convenient means of personalization. Furthermore, since only the light-transmitting panel 4 needs to be replaced without requiring large-scale modifications to the entire lamp bead assembly or protection bar, the cost of customization is significantly reduced, minimizing the impact on other vehicle components.

In another embodiment, adjacent lamp bead assemblies 2 are electrically connected in series via the positive terminal opening 11 and the negative terminal opening 12. In this embodiment, once all lamp bead assemblies are inserted into the positioning holes, the electrical wiring between adjacent lamp bead assemblies is connected, and finally, the protection bar is installed onto the vehicle. This design simplifies circuit connections, enhances installation efficiency, and improves the reliability and stability of the electrical system.

In another embodiment, the outer edge of the light-transmitting panel 4 extends a distance D from the lamp housing base 5, wherein $D>L$. In this embodiment, when the lamp bead assembly 2 is inserted into the positioning hole 3 of the protection bar body 1, the locking members 6 smoothly pass through the edge of the light-transmitting panel 4 and securely engage the edge of the positioning hole 3. This design improves the ease and reliability of installation, preventing the lamp bead assembly 2 from loosening or detaching due to vibrations or impacts while the vehicle is in operation.

Figure 1:
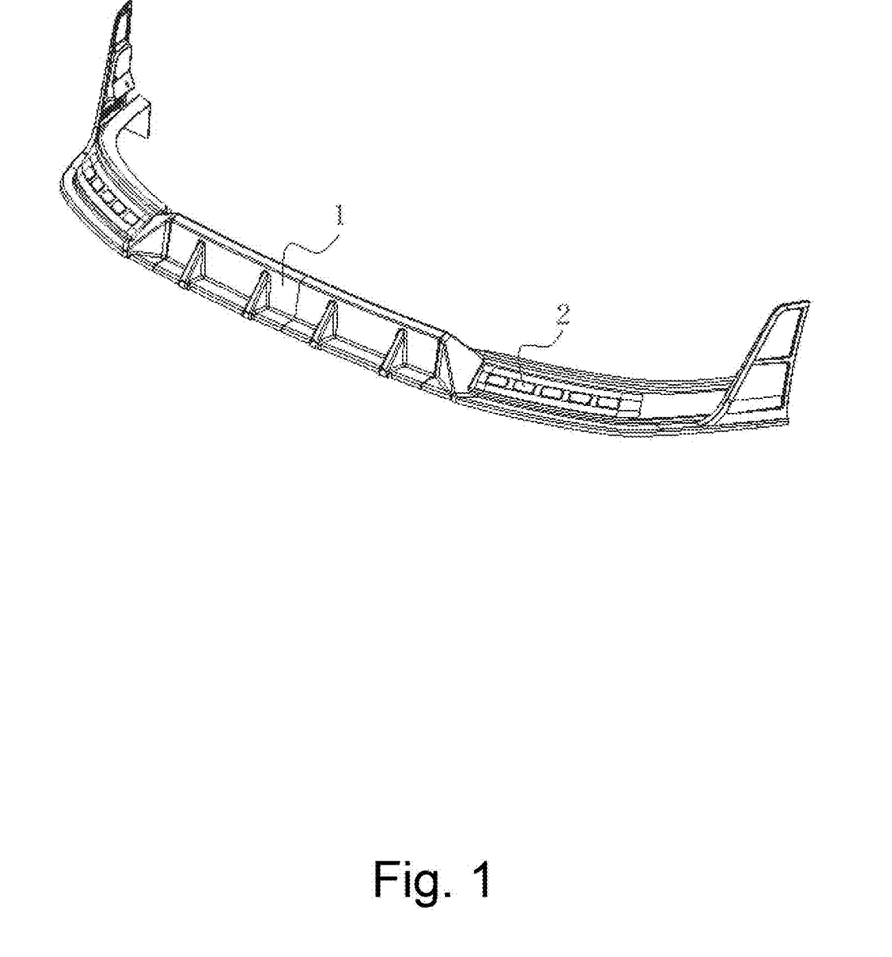
FIG. 1 shows a three-dimensional perspective view of an embodiment of the present application.
Figure 2:
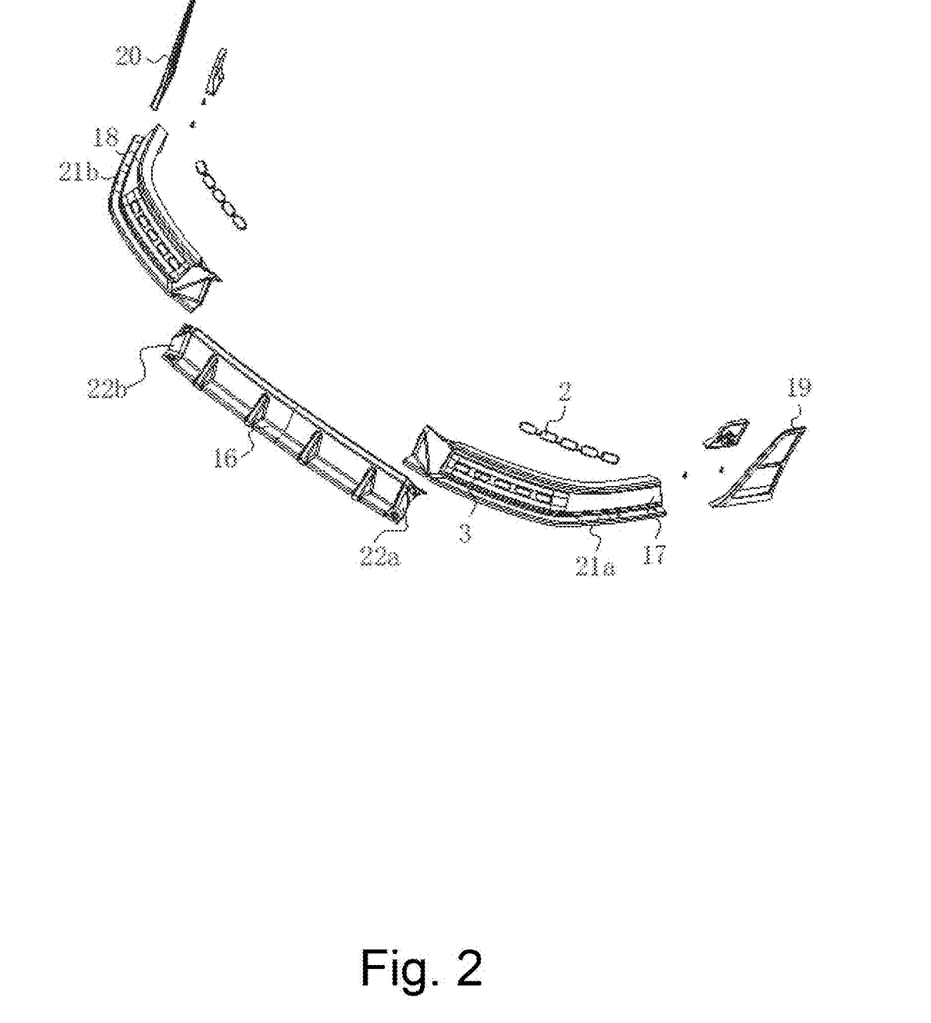
FIG. 2 shows an exploded view of FIG. 1.

Additionally, in another embodiment, the protection bar body 1 includes a main front guard rail 16, a detachable left guard rail 17, a detachable right guard rail 18, and first and second support legs 19 and 20, respectively. In this embodiment, a modular configuration is adopted for the front guard rail, left guard rail, right guard rail, first support leg, and second support leg, allowing the front splitter to be disassembled into smaller components. This reduces storage and transportation costs and allows for the selective replacement of damaged parts, thereby reducing maintenance costs.

In another embodiment, the left guard rail 17 and the right guard rail 18 are provided with mounting steps 21a and 21b for securing the first support leg 19 and the second support leg 20. In this embodiment, the mounting steps enhance the stability of the entire front splitter structure by securely connecting the first and second support legs to the left and right guard rails. Furthermore, by attaching the first and second support legs to the mounting steps, they can be easily disassembled and replaced, reducing maintenance costs. Additionally, the mounting steps provide a certain height, optimizing the aerodynamic efficiency of the front splitter structure, which helps to reduce air resistance when the vehicle is in motion.

In another embodiment, the mounting steps 21a and 21b extend horizontally outward. In this embodiment, the horizontally extended mounting steps provide a larger mounting area for the first and second support legs, ensuring a stronger connection with the left and right guard rails. This enhances the structural stability of the entire front splitter. Additionally, the horizontal extension of the mounting steps ensures that the base of the first and second support legs is evenly distributed, reducing stress concentration and increasing the durability of the front splitter. Furthermore, the horizontal extension of the mounting steps provides additional support, allowing the first and second support legs to better absorb and distribute impact energy, thereby improving impact resistance. The mounting steps can also be designed in inclined or curved shapes to accommodate different vehicle models or installation needs, or reinforcement ribs and support plates can be added to increase structural strength and stability.

Additionally, in another embodiment, the main front guard rail 16 includes recessed connection sections 22a and 22b at both ends, which are configured to accommodate and align with the left guard rail 17 and the right guard rail 18. In this embodiment, the recessed connection sections allow the left and right guard rails to tightly fit onto the main front guard rail, increasing the contact area and improving connection stability. This design enhances structural integrity and reduces component gaps, improving the robustness and durability of the entire front splitter structure. Additionally, the recessed connection sections allow for more precise alignment of the left and right guard rails with the main front guard rail, making assembly easier and reducing installation time and labor costs. Furthermore, this configuration improves the aesthetic appearance and aerodynamic performance of the front splitter structure.

In another optional embodiment, the left guard rail 17 and the right guard rail 18 are provided with first alignment pins 23 and second alignment pins 24, respectively, while the recessed connection sections 22a and 22b on both ends of the main front guard rail 16 include corresponding first slots 25 and second slots 26. In this embodiment, fastening components pass through the first alignment pin 23 and the first slot 25 to connect the left guard rail 17 to the main front guard rail 16, while fastening components pass through the second alignment pin 24 and the second slot 26 to connect the right guard rail 18 to the main front guard rail 16.

Through the cooperation of the alignment pins and slots, the left and right guard rails can be quickly pre-positioned relative to the main front guard rail, facilitating initial alignment during assembly. This simple and user-friendly connection method reduces installation time and labor costs. Furthermore, the alignment pin and slot design increases connection flexibility, allowing for fine adjustments in connection distances as needed, thereby accommodating different vehicle models or installation requirements.

Accordingly, the car front protection bar with a lighting device can achieve modular maintenance by separately configuring the protection bar body and the lamp bead assemblies. When a lamp bead assembly is partially damaged, only the damaged lamp bead assembly needs to be replaced without requiring the replacement of the entire front protection bar, thereby significantly reducing maintenance costs. Once the light-transmitting panel and the lamp housing base are assembled, the lamp bead assembly is installed into the positioning hole using an interference fit, wherein the installation slot engages with the edge of the positioning hole to complete the installation. Furthermore, due to the split-type design, the lamp bead assemblies are adaptable to different vehicle models, requiring only installation onto different protection bar bodies to achieve full functionality, thereby enhancing adaptability, improving maintenance flexibility, and increasing economic efficiency.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The terms and expressions used herein have the ordinary meaning accorded to such terms and expressions in their respective areas, except where specific meanings have been set forth. Relational terms such as "clockwise" and "counterclockwise" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A car front protection bar with a accommodating lamp bead assemblies, comprising:
 a protection bar body having a plurality of positioning holes; and
 a plurality of lamp bead assemblies detachably mounted in the positioning holes, wherein
 each of the lamp bead assemblies includes a light-transmitting panel and a lamp housing base,
 the lamp housing base is integrally formed with a pair of elastic locking members extending outward from opposite sides of the lamp housing base, the locking members and the light-transmitting panel cooperatively define an installation slot configured to engage an edge of a corresponding one of the positioning holes through an interference fit, and the protection bar body the lamp bead assemblies are separate, modular components allowing independent replacement of the lamp bead assemblies without detaching the protection bar body.

2. The car front protection bar with accommodating lamp bead assemblies of claim 1, wherein the locking members are provided at an upward inclination from a bottom of the lamp housing base, and wherein an outer surface of the locking members has a curved surface.

3. The car front protection bar with accommodating lamp bead assemblies of claim 1, wherein the lamp housing base includes a contact block positioned between the light-transmitting panel and the locking members.

4. The car front protection bar with accommodating lamp bead assemblies of claim 3, wherein the locking members are elastic, wherein the contact block has a height of H, wherein when the contact block is not subjected to an external force, a distance between an outer end of the locking members and the lamp housing base is L, wherein L is greater than H, and wherein when the contact block is pressed under the external force, a distance between the outer end of the locking members and the lamp housing base is S, wherein S is less than H.

5. The car front protection bar with accommodating lamp bead assemblies of claim 4, wherein a distance from an outer edge of the light-transmitting panel to the lamp housing base is D, wherein D is greater than or equal to L.

6. The car front protection bar with accommodating lamp bead assemblies of claim 1, further comprising a reinforcement rib at a connection between the locking members and the lamp housing base.

7. The car front protection bar with accommodating lamp bead assemblies of claim 1, wherein a bottom of the lamp housing base includes a positive terminal opening and a negative terminal opening, each configured to allow positive and negative electrical wiring, respectively, to penetrate into an interior of the lamp housing base.

8. The car front protection bar with accommodating lamp bead assemblies of claim 7, wherein adjacent lamp bead assemblies are electrically connected in series through the positive terminal opening and the negative terminal opening.

9. The car front protection bar with accommodating lamp bead assemblies of claim 1, wherein a lamp bead is provided in the lamp housing base.

10. The car front protection bar with accommodating lamp bead assemblies of claim 1, wherein the light-transmitting panel and the lamp housing base are joined by ultrasonic welding.

* * * * *